United States Patent
Liu et al.

(10) Patent No.: US 9,807,094 B1
(45) Date of Patent: Oct. 31, 2017

(54) SYSTEMS AND METHODS FOR DYNAMIC ACCESS CONTROL OVER SHARED RESOURCES

(71) Applicant: Symantec Corporation, Mountain View, CA (US)

(72) Inventors: Yin Liu, Sunnyvale, CA (US); Sandeep Bhatkar, Sunnyvale, CA (US); Kevin Roundy, El Segundo, CA (US); Leylya Yumer, Antibes (FR); Anand Kashyap, Los Altos, CA (US); Aleatha Parker-Wood, Palo Alto, CA (US); Christopher Gates, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 32 days.

(21) Appl. No.: 14/749,676

(22) Filed: Jun. 25, 2015

(51) Int. Cl.
*H04L 29/06* (2006.01)
*G06F 21/62* (2013.01)
*G06N 99/00* (2010.01)

(52) U.S. Cl.
CPC .............. *H04L 63/10* (2013.01); *G06F 21/62* (2013.01); *G06N 99/005* (2013.01)

(58) Field of Classification Search
CPC ....... H04L 63/10; H04L 63/102; G06F 21/60; G06F 21/62
See application file for complete search history.

(56) References Cited

U.S. PATENT DOCUMENTS

| 2012/0203590 A1* | 8/2012 | Deb ................... G06Q 10/0635 705/7.28 |
| 2012/0210388 A1* | 8/2012 | Kolishchak ........... G06F 21/552 726/1 |
| 2013/0047204 A1* | 2/2013 | Radhakrishnan ..... G06F 21/335 726/1 |
| 2013/0227712 A1* | 8/2013 | Salem ................. G06F 21/6218 726/30 |

(Continued)

OTHER PUBLICATIONS

"Dynamic Access Control Overview", https://technet.microsoft.com/en-us/library/dn408191.aspx, as accessed May 26, 2015, Microsoft, (Jul. 31, 2013).

(Continued)

*Primary Examiner* — Khang Do
(74) *Attorney, Agent, or Firm* — FisherBroyles, LLP

(57) ABSTRACT

The disclosed computer-implemented method for dynamic access control over shared resources may include (1) detecting an attempt by a user to access a resource via a computing environment, (2) identifying a risk level of the user attempting to access the resource, (3) identifying a sensitivity level of the resource, (4) identifying a risk level of the computing environment through which the user is attempting to access the resource, (5) determining an overall risk level for the attempt to access the resource based at least in part on (A) the risk level of the user, (B) the sensitivity level of the resource, and (C) the risk level of the computing environment, and then (6) determining, based at least in part on the overall risk level, whether to grant the user access to the resource via the computing environment. Various other methods, systems, and computer-readable media are also disclosed.

17 Claims, 7 Drawing Sheets

(56) References Cited

U.S. PATENT DOCUMENTS

| | | | | |
|---|---|---|---|---|
| 2013/0232582 A1* | 9/2013 | Jin | ............................ | G06F 21/62 |
| | | | | 726/28 |
| 2014/0380484 A1* | 12/2014 | Choi | ....................... | G06F 21/577 |
| | | | | 726/25 |
| 2015/0106888 A1* | 4/2015 | Cheng | ...................... | G06F 21/62 |
| | | | | 726/5 |
| 2016/0004862 A1* | 1/2016 | Almehmadi | ........... | G06F 21/552 |
| | | | | 726/25 |
| 2016/0224781 A1* | 8/2016 | Doddy | ..................... | G06F 21/45 |
| 2016/0226911 A1* | 8/2016 | Boss | ......................... | H04L 63/20 |

OTHER PUBLICATIONS

"Lock-and-Key: Dynamic Access Lists", http://www.cisco.com/c/en/us/support/docs/security-vpn/lock-key/7604-13.html, as accessed May 26, 2015, Document ID: 7604, Cisco, (Jul. 12, 2006).

"NetScaler Gateway", https://www.citrix.com/products/netscaler-gateway/overview.html, as accessed May 26, 2015, Citrix Systems, Inc., (Jun. 3, 2013).

Miller, Ron "MobileIron Wants to Be Your Cloud Content Security Umbrella", http://techcrunch.com/2015/02/03/mobileiron-wants-to-be-your-cloud-content-security-umbrella/, as accessed May 26, 2015, TechCrunch, AOL Inc., (Feb. 3, 2015).

"Network Access Control", http://www.bradfordnetworks.com/solutions/use-cases/network-access-control/, as accessed May 26, 2015, Bradford Networks, (Feb. 13, 2014).

\* cited by examiner

SYSTEMS AND METHODS FOR DYNAMIC ACCESS CONTROL OVER SHARED RESOURCES

BACKGROUND

Managing access to resources shared within an organization (sometimes referred to as "access control") is often a challenging task for security personnel. On the one hand, the security personnel may be responsible for ensuring that all employees of an organization have sufficient access to necessary resources. On the other hand, the security personnel may also be responsible for preventing certain individuals and/or processes from accessing restricted and/or sensitive resources. Unfortunately, in the event that the organization is rather large and/or growing, the access needs of the employees may evolve and/or change fairly regularly. To accommodate the access needs of the employees through conventional access control, the security personnel may have to manually update policies that control access to the organization's resources on a daily basis.

This conventional approach to access control may have certain downsides and/or inefficiencies. For example, security personnel may invest considerable time and/or effort into monitoring and/or tracking the ever-changing access needs of employees, not to mention entering manual updates to the access-control policies. Moreover, those manual updates may naturally result in certain errors introduced by the security personnel. Such errors may potentially compromise sensitive resources and/or leave the organization's computing environment vulnerable to insider attacks and/or data theft.

The instant disclosure, therefore, identifies and addresses a need for additional and improved systems and methods for dynamic access control over shared resources.

SUMMARY

As will be described in greater detail below, the instant disclosure describes various systems and methods for dynamic access control over shared resources. In some examples, a computer-implemented method for dynamic access control over shared resources may include (1) detecting an attempt by a user to access a resource via a computing environment, (2) identifying a risk level of the user attempting to access the resource via the computing environment, (3) identifying a sensitivity level of the resource that the user is attempting to access via the computing environment, (4) identifying a risk level of the computing environment through which the user is attempting to access the resource, (5) determining an overall risk level for the attempt by the user to access the resource based at least in part on (A) the risk level of the user, (B) the sensitivity level of the resource, and (C) the risk level of the computing environment, and then (6) determining, based at least in part on the overall risk level for the attempt by the user, whether to grant the user access to the resource via the computing environment.

In some examples, the user may include and/or represent a person operating a computing system. In other examples, the user may include and/or represent a computing process running on a computing system.

In some examples, the computing environment may include and/or represent a specific type of network through which the user is attempting to access the resource. Additionally or alternatively, the computing environment may include and/or represent a specific type of computing system on which the user is attempting to access the resource.

Additionally or alternatively, the computing environment may include and/or represent a specific type of application by which the user is attempting to access the resource. Accordingly, the computing environment may include, represent, and/or take into account a combination of various features and/or computing elements (including, e.g., any of those mentioned above).

In some examples, the resource may include and/or represent a file. Additionally or alternatively, the resource may include and/or represent a database.

In some examples, the method may also include identifying a user-specific risk value that is based at least in part on a role type of the user and/or a behavior of the user. In these examples, the method may further include identifying a resource-specific sensitivity value that represents the sensitivity level of the resource. Additionally or alternatively, the method may include identifying an environment-specific risk value that represents the risk level of the computing environment. Finally, the method may include calculating an overall risk score that represents the overall risk level based at least in part on (1) the user-specific risk value that corresponds to the role type of the user, (2) the resource-specific sensitivity value that represents the sensitivity level of the resource, and (3) the environment-specific risk value of the computing environment.

In some examples, the method may also include dynamically calculating the user-specific risk value using at least one machine learning technique. In such examples, the method may further include dynamically calculating the resource-specific sensitivity value using at least one machine learning technique. Additionally or alternatively, the method may include dynamically calculating the environment-specific risk value using at least one machine learning technique.

In some examples, the method may also include calculating an environment-specific risk value that represents the risk level of the computing environment based at least in part on (1) a specific type of network through which the user is attempting to access the resource, (2) a specific type of computing system on which the user is attempting to access the resource, and (3) a specific type of application by which the user is attempting to access the resource. In some examples, the method may also include dynamically calculating the overall risk level for the attempt to access the resource in response to detecting the attempt to access the resource.

In some examples, the method may also include determining whether the overall risk level for the attempt to access the resource satisfies a certain threshold. For example, the method may further include determining that the overall risk level for the attempt to access the resource is below a certain risk threshold. Additionally or alternatively, the method may include granting the user access to the resource due at least in part to the overall risk level being below the certain risk threshold.

As another example, the method may further include determining that the overall risk level for the attempt to access the resource is above a certain risk threshold. Additionally or alternatively, the method may include denying the user access to the resource due at least in part to the overall risk level being above the certain risk threshold.

In some examples, a system for implementing the above-described method may include (1) an access-detection module, stored in memory, that detects an attempt by a user to access a resource via a computing environment, (2) a risk-assessment module, stored in memory, that (A) identifies a risk level of the user attempting to access the resource via the computing environment, (B) identifies a sensitivity level of the resource that the user is attempting to access via the computing environment, (C) identifies a risk level of the computing environment through which the user is attempting to access the resource, and then (D) determines an overall risk level for the attempt by the user to access the resource based at least in part on (I) the risk level of the user, (II) the sensitivity level of the resource, and (III) the risk level of the computing environment, and (3) an access-control module, stored in memory, that determines, based at least in part on the overall risk level for the attempt by the user, whether to grant the user access to the resource via the computing environment, and (4) at least one physical processor configured to execute the access-detection module, the risk-assessment module, and the access-control module.

In some examples, the above-described method may be encoded as computer-readable instructions on a non-transitory computer-readable medium. For example, a computer-readable medium may include one or more computer-executable instructions that, when executed by at least one processor of a computing device, cause the computing device to (1) detect an attempt by a user to access a resource via a computing environment, (2) identify a risk level of the user attempting to access the resource via the computing environment, (3) identify a sensitivity level of the resource that the user is attempting to access via the computing environment, (4) identify a risk level of the computing environment through which the user is attempting to access the resource, (5) determine an overall risk level for the attempt by the user to access the resource based at least in part on (A) the risk level of the user, (B) the sensitivity level of the resource, and (C) the risk level of the computing environment, and then (6) determine, based at least in part on the overall risk level for the attempt by the user, whether to grant the user access to the resource via the computing environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
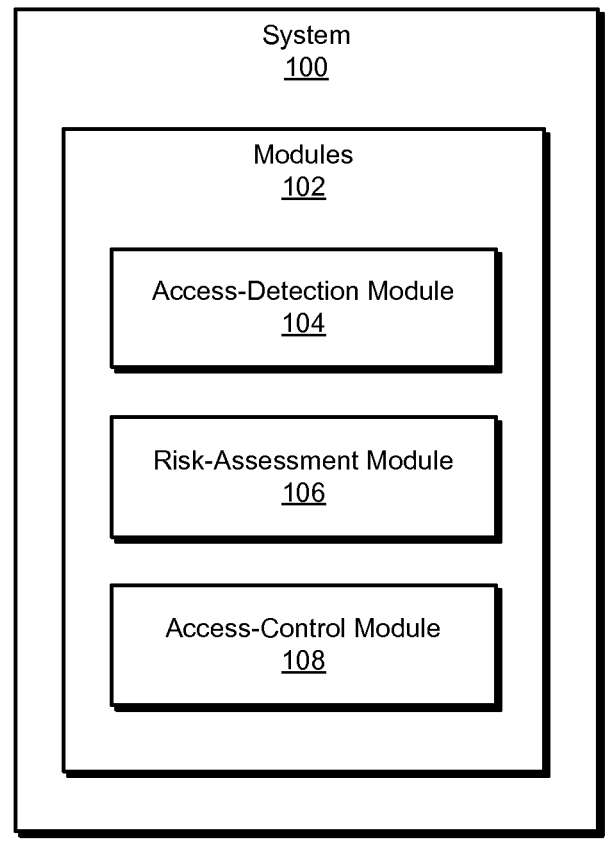
FIG. 1 is a block diagram of an exemplary system for dynamic access control over shared resources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for dynamic access control over shared resources. As will be explained in greater detail below, by identifying details related to each attempt to access resources shared within an organization, the various systems and methods described herein may be able to evaluate the risk involved in each access attempt on a case-by-case basis. Moreover, by evaluating the risk involved in each access attempt in this way, the various systems and methods described herein may be able to grant and/or deny access to certain resources within the organization without relying on conventional policy-driven approaches to access control (such as access-control listing, whitelisting, and/or blacklisting).

As a result, the various systems and methods described herein may be able to mitigate and/or reduce the amount of manual human intervention needed to update and/or manage the access privileges of employees of the organization. Since, in this case, the access privileges of the employees are evaluated and/or determined on a case-by-case basis in accordance with the risk involved in each access attempt (instead of simply checking a list that identifies the access privileges of the employees), the type or model of dynamic access control described herein may be considered and/or referred to as "policy-less" access control.

Figure 2:
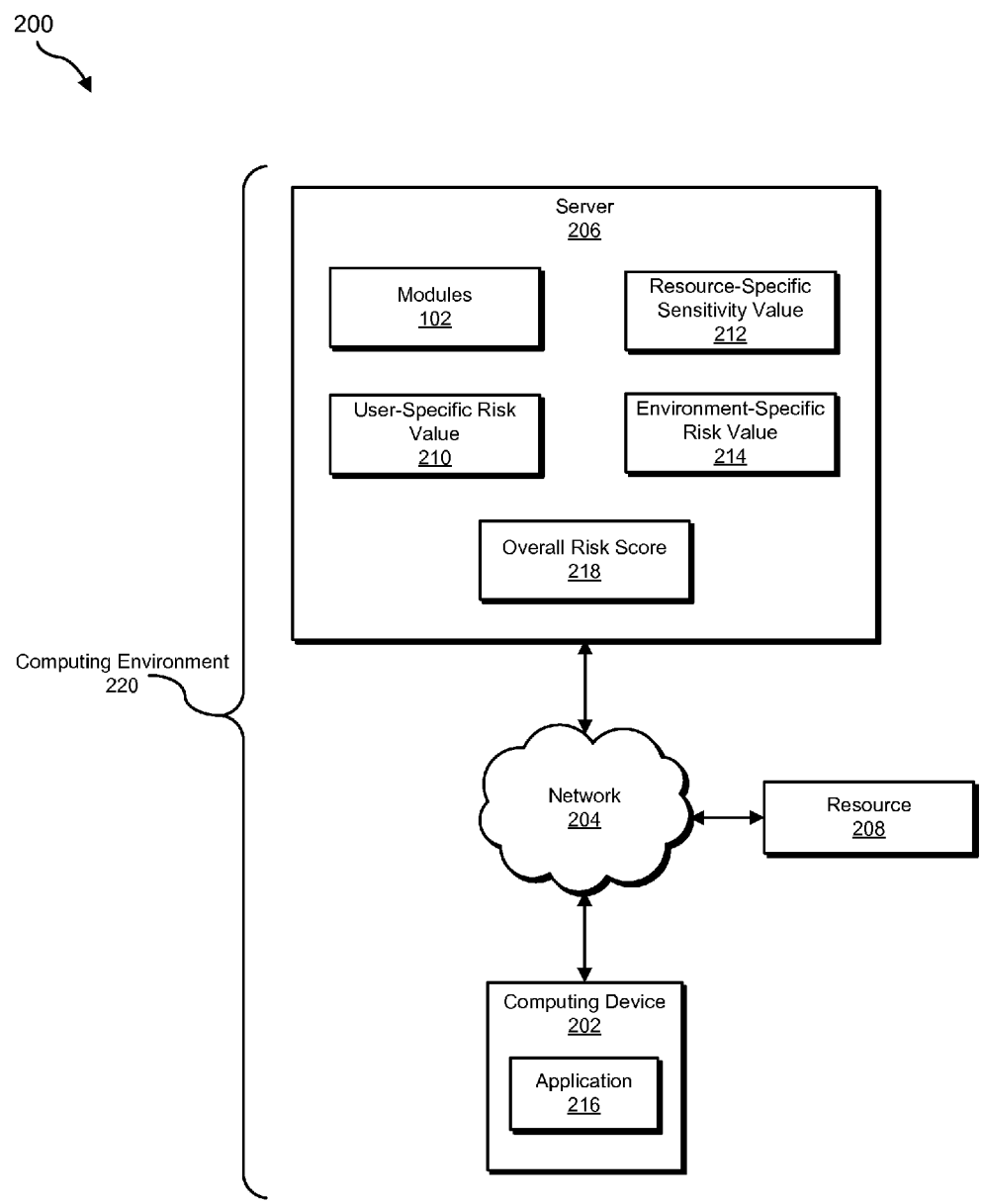
FIG. 2 is a block diagram of an additional exemplary system for dynamic access control over shared resources.

The following will provide, with reference to FIGS. 1 and 2, detailed descriptions of exemplary systems for dynamic access control over shared resources. Detailed descriptions of corresponding computer-implemented methods will be provided in connection with FIG. 3. Detailed descriptions of exemplary information that identifies a user-specific risk value, a resource-specific sensitivity value, and an environment-specific risk value will be provided in connection with FIG. 4. Detailed descriptions of exemplary information that identifies an overall risk score formula and an overall risk score will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for dynamic access control over shared resources. As illustrated in this figure, exemplary system 100 may include one or more modules 102 for performing one or more tasks. For example, and as will be explained in greater detail below, exemplary system 100 may include an access-detection module 104 that detects an attempt by a user to access a resource via a computing environment. Exemplary system 100 may also include a risk-assessment module 106 that (1)

identifies a risk level of the user attempting to access the resource via the computing environment, (2) identifies a sensitivity level of the resource that the user is attempting to access via the computing environment, (3) identifies a risk level of the computing environment through which the user is attempting to access the resource, and then (4) determine an overall risk level for the attempt by the user to access the resource based at least in part on (A) the risk level of the user, (B) the sensitivity level of the resource, and (C) the risk level of the computing environment.

In addition, and as will be described in greater detail below, exemplary system 100 may include an access-control module 108 that determines, based at least in part on the overall risk level for the attempt by the user, whether to grant the user access to the resource via the computing environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include and/or represent a computing environment 220 in which a computing device 202 is able to communicate with a server 206 via a network 204. In one example, computing device 202 may be programmed with one or more of modules 102. Additionally or alternatively, server 206 may be programmed with one or more of modules 102.

As shown in FIG. 2, system 200 may also include a resource 208 to which a user of computing device 202 is attempting to gain access by way of an application 216. System 200 may also include a user-specific risk value 210 that is based at least in part on a role of the user and/or the user's behavior, a resource-specific sensitivity value 212 that represents the sensitivity level of resource 208, an environment-specific risk value 214 that represents the risk level of computing environment 220, and/or an overall risk score 218 that represents the overall risk level for the attempt to access resource 208. In one example, computing device 202 may include, detect, calculate, and/or store user-specific risk value 210, resource-specific sensitivity value 212, environment-specific risk value 214, and/or overall risk score 218. Additionally or alternatively, computing device 202 may include, detect, calculate, and/or store user-specific risk value 210, resource-specific sensitivity value 212, environment-specific risk value 214, and/or overall risk score 218.

In one embodiment, one or more of modules 102 from FIG. 1 may, when executed by at least one processor of computing device 202 and/or server 206, enable computing device 202 and/or server 206 to facilitate and/or maintain dynamic access control over shared resources. For example, and as will be described in greater detail below, one or more of modules 102 may cause computing device 202 and/or server 206 to (1) detect an attempt by a user of computing device 202 to access resource 208 via computing environment 220, (2) identify a risk level of the user attempting to access resource 208 via computing environment 220, (3) identify a sensitivity level of resource 208 that the user is attempting to access via computing environment 220, (4) identify a risk level of computing environment 220 through which the user is attempting to access resource 208, (5) determine an overall risk level for the attempt by the user to access resource 208 based at least in part on (A) the risk level of the user, (B) the sensitivity level of resource 208, and (C) the risk level of computing environment 220, and then (6) determine, based at least in part on the overall risk level for the attempt by the user, whether to grant the user access to resource 208 via computing environment 220.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device capable of facilitating and/or maintaining dynamic access control over shared resources. Examples of server 206 include, without limitation, security servers, application servers, web servers, network devices (such as routers, switches, hubs, modems, bridges, repeaters, and/or gateways), storage servers, and/or database servers configured to run certain software applications and/or provide various security, web, networking, storage, and/or database services. Although illustrated as a single device, server 206 may represent a plurality of servers working in conjunction with one another to facilitate and/or maintaining dynamic access control over shared resources.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Virtual Private Network (VPN), a corporate network, an enterprise network, a home network, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Resource 208 generally represents any type or form of data, interface, computing object, and/or computing device. In one example, resource 208 may include and/or represent a file. Additionally or alternatively, resource 208 may include and/or represent a database. In a further example, resource 208 may include and/or represent a physical computing device. Although illustrated as a stand-alone entity in FIG. 2, resource 208 may be stored and/or maintained by a computing device included in computing environment 220. For example, resource 208 may be stored and/or maintained by server 206 or a computing device (not illustrated in FIG. 2) that sits behind server 206.

Application 216 generally represents any type or form of process, interface, and/or software that facilitates attempts to access a resource. In one example, application 216 may be directed by a user of computing device 202 to access resource 208 via network 204. In another example, application 216 may be configured to autonomously attempt to access resource 208 via network 204. In this example, application 216 may itself be considered the user of computing device 202. Accordingly, in certain embodiments, application 216 may itself constitute and/or represent the user of computing device 202.

Computing environment 220 generally represents any combination of computing elements involved in an attempt to access a resource. For example, computing environment 220 may include and/or represent a combination of the network (such as network 204) used in an attempt to access resource 208, the computing device (such as computing device 202) on which the user is attempting to access resource 208, and the application (such as application 216) used in the attempt to access resource 208. In other words, computing environment 220 may constitute, represent, and/or describe the details and/or context involved in the attempt to access resource 208.

Figure 3:
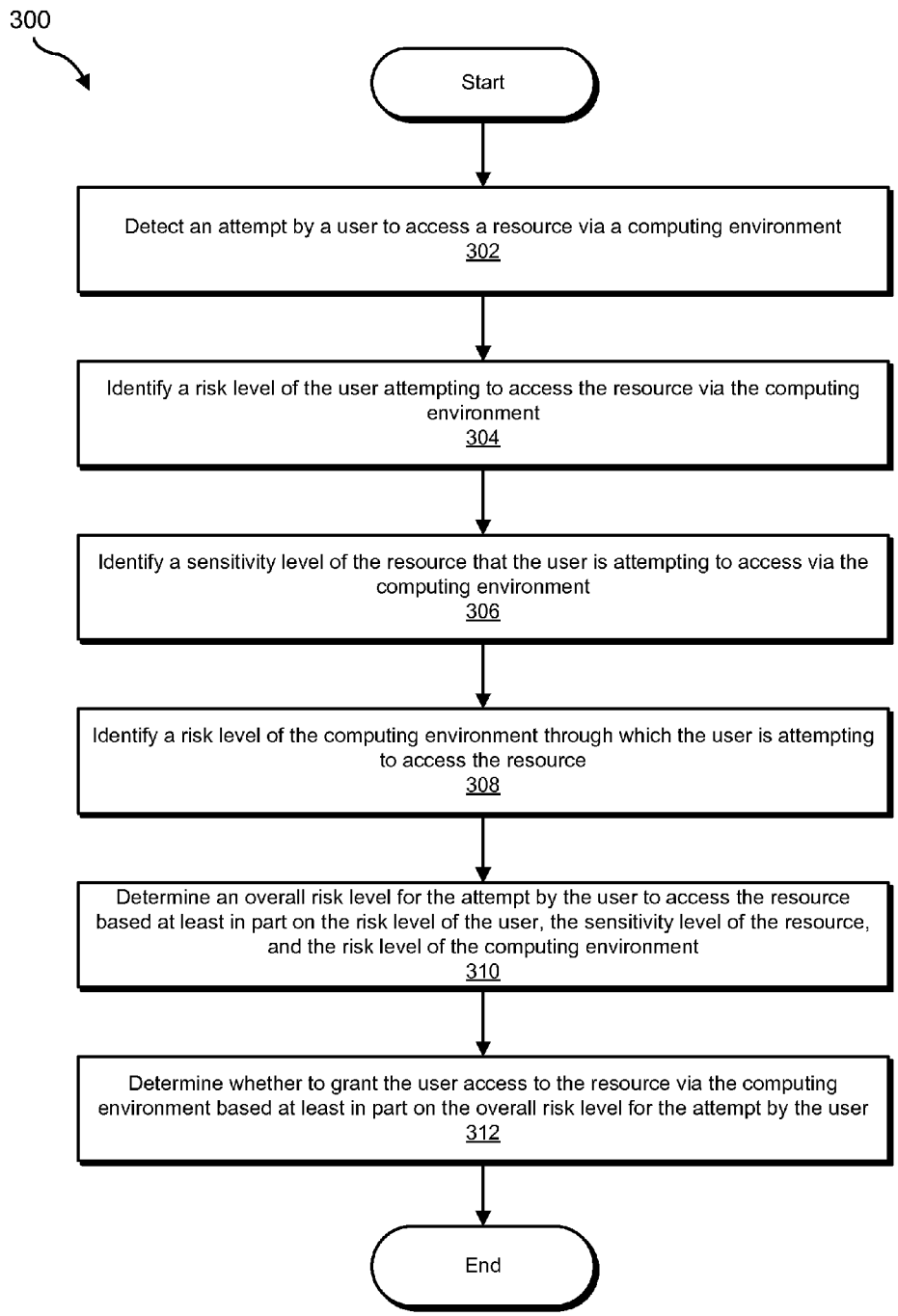
FIG. 3 is a flow diagram of an exemplary method for dynamic access control over shared resources.

FIG. 3 is a flow diagram of an exemplary computer-implemented method 300 for dynamic access control over shared resources. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect an attempt by a user to access a resource via a computing environment. For example, access-detection module 104 may, as part of server 206 in FIG. 2, detect an attempt by a user to access resource 208 via computing environment 220. In one example, the user may be a person operating computing device 202. Additionally or alternatively, the user may be an application (such as application 216) and/or process running on computing device 202.

The systems described herein may perform step 302 in a variety of ways. In some examples, access-detection module 104 may detect the attempt to access resource 208 by monitoring computing environment 220 and/or resource 208. For example, access-detection module 104 may monitor computing environment 220 for any attempts to gain access to shared resources within an organization. While monitoring computing environment 220, access-detection module 104 may detect a request originating from computing device 202 to access resource 208. Access-detection module 104 may then determine that a user of computing device 202 is attempting to access resource 208 based at least in part on this request.

In one example, the attempt to access resource 208 may involve, include, and/or represent any type or form of Input/Output (I/O) request. For example, access-detection module 104 may detect a read request from computing device 202 to read resource 208. Additionally or alternatively, access-detection module 104 may detect a write request originating from computing device 202 to write to and/or modify resource 208.

Returning to FIG. 3, at step 304 one or more of the systems described herein may identify a risk level of the user attempting to access the resource via the computing environment. For example, risk-assessment module 106 may, as part of server 206 in FIG. 2, identify a risk level of the user attempting to access resource 208 via computing environment 220. The risk level of the user may be based on and/or take into account a variety of different factors.

As an example, the risk level of the user may be based at least in part on the role or class of the user relative to the organization. This role or class of the user may be represented by and/or based on any type or form of authority-related or security-based distinction. Examples of the role or class of the user include, without limitation, low-level employee, mid-level employee, executive, officer, minimum security clearance, mid-level security clearance, maximum security clearance, trusted user, semi-trusted user, untrusted user, variations of one or more of the same, combinations of one or more of the same, or any other suitable role or class of the user.

Additionally or alternatively, the risk level of the user may be based at least in part on the user's computing behavior and/or tendencies. Examples of such computing behavior and/or tendencies include, without limitation, the user's computing and/or online activities, the user's browsing history, the health or hygiene of the user's computing device (e.g., computing device 202), the purpose for which the user operates his or her computing device, variations of one or more of the same, combinations or one or more of the same, or any other computing behavior and/or tendencies.

The systems described herein may perform step 304 in a variety of ways. In some examples, risk-assessment module 106 may identify the role or class of the user based at least in part on the request detected in connection with the attempt to access resource 208. For example, risk-assessment module 106 may analyze the request to determine the source of the request. In this example, risk-assessment module 106 may determine that the request originated from computing device 202 based at least in part on this analysis.

In one example, risk-assessment module 106 may identify computing device 202 as belonging to and/or being operated by a specific person. For example, risk-assessment module 106 may identify computing device 202 as belonging to and/or being operated by a certain employee of an organization. Risk-assessment module 106 may then determine the role or class of this employee by searching a database that identifies the roles and/or classes of employees of the organization.

Additionally or alternatively, risk-assessment module 106 may identify computing device 202 as belonging to and/or being operated by a specific person. For example, risk-assessment module 106 may identify computing device 202 as belonging to and/or being operated by a certain employee of an organization. Risk-assessment module 106 may then determine that the role or class of this employee.

In one example, risk-assessment module 106 may identify a user-specific risk value that corresponds to the role or class type of the user. For example, risk-assessment module 106 may determine that the user is a fairly low-level employee of the organization. Additionally or alternatively, risk-assessment module 106 may identify a risk value or score (e.g., a number or percentage) assigned to employees of that fairly low level. Accordingly, this risk value or score may represent the risk level of the fairly low-level employee in a resource-access context.

In one example, risk-assessment module 106 may dynamically calculate the user-specific risk value using any type or form of machine learning technique. For example, risk-assessment module 106 may compute the user-specific risk value of the user by applying a regression analysis. Accordingly, the user-specific risk value of the user may adapt, evolve, and/or be refined or updated over time and/or based at least in part on empirical data and/or results from earlier analyses.

Additionally or alternatively, risk-assessment module 106 may analyze one or more computing behaviors and/or tendencies of the user. For example, risk-assessment module 106 may observe and/or review any of the user's computing behaviors and/or tendencies. Risk-assessment module 106 may then take the user's computing behaviors and/or tendencies into account when calculating the user-specific risk value.

In one example, risk-assessment module 106 may identify a risk level of application 216 that initiated the request to access resource 208 from computing device 202. For example, risk-assessment module 106 may determine that application 216 has been classified as suspicious and/or untrustworthy. Additionally or alternatively, risk-assessment module 106 may determine that application 216 has been classified as benign and/or trustworthy. In any case, risk-assessment module 106 may identify a risk value or score that corresponds to and/or represents the risk level of application 216 in a resource-access context in accordance with the classification of application 216.

Returning to FIG. 3, at step 306 one or more of the systems described herein may identify a sensitivity level of the resource that the user is attempting to access via the computing environment. For example, risk-assessment module 106 may, as part of server 206 in FIG. 2, identify a sensitivity level of resource 208 that the user is attempting to access via computing environment 220. In one example, the sensitivity level may correspond to and/or represent the value, secrecy level, and/or classification of resource 208. Additionally or alternatively, the sensitivity level may correspond to and/or represent the degree of fallout and/or damage that could potentially result from the disclosure and/or theft of resource 208.

The systems described herein may perform step 306 in a variety of ways. In some examples, risk-assessment module 106 may identify the sensitivity level of resource 208 based at least in part on the request detected in connection with the attempt to access resource 208. For example, risk-assessment module 106 may analyze the request to determine which resource the user is attempting to access via computing environment 220. In this example, risk-assessment module 106 may determine that the user is attempting to access resource 208 based at least in part on this analysis.

In one example, risk-assessment module 106 may identify the sensitivity level of resource 208 based at least in part on the resource type and/or classification of resource 208. For example, risk-assessment module 106 may determine the resource type and/or classification of resource 208 by analyzing the request detected in connection with the attempt to access resource 208. Additionally or alternatively, risk-assessment module 106 may determine the resource type and/or classification of resource 208 by searching a database that identifies the resource type and/or classification of shared resources within the organization. Moreover, risk-assessment module 106 may determine the sensitivity level of resource 208 by searching a database that identifies sensitivity levels for certain resource types and/or classifications within the organization.

In one example, risk-assessment module 106 may identify a resource-specific sensitivity value that represents the sensitivity level of resource 208. For example, risk-assessment module 106 may identify a sensitivity value or score (e.g., a number or percentage) assigned specifically to resource 208. Additionally or alternatively, risk-assessment module 106 may determine a sensitivity value or score (e.g., a number or percentage) assigned to the resource type and/or classification of resource 208.

In one example, risk-assessment module 106 may dynamically calculate the resource-specific sensitivity value of resource 208 using any type or form of machine learning technique. For example, risk-assessment module 106 may compute the resource-specific sensitivity value of resource 208 by applying a regression analysis. Accordingly, the resource-specific sensitivity value of resource 208 may adapt, evolve, and/or be refined or updated over time and/or based at least in part on empirical data and/or results from earlier analyses.

Returning to FIG. 3, at step 308 one or more of the systems described herein may identify a risk level of the computing environment through which the user is attempting to access the resource. For example, risk-assessment module 106 may, as part of server 206 in FIG. 2, identify a risk level of computing environment 220 through which the user is attempting to access resource 208. In this example, the risk level of computing environment 220 may correspond to and/or represent the likelihood and/or degree of threat or danger associated with the specific combination of computing elements involved in the user's attempt to access resource 208.

The systems described herein may perform step 308 in a variety of ways. In some examples, risk-assessment module 106 may identify the risk level of computing environment 220 based at least in part on the request detected in connection with the attempt to access resource 208. In one example, risk-assessment module 106 may analyze the request to determine the various computing elements involved in the user's attempt to access resource 208. For example, risk-assessment module 106 may determine that the user is attempting to access resource 208 by way of application 216, network 204, and/or computing device 202. In this example, application 216, network 204, and/or computing device 202 may collectively represent and/or form computing environment 220 (or at least a portion of computing environment 220).

In one example, risk-assessment module 106 may determine the risk level of computing environment 220 based at least in part on the risk levels of the individual computing elements included in computing environment 220. For example, risk-assessment module 106 may identify certain weights, values, and/or scores assigned to application 216, network 204, and/or computing device 202. In this example, risk-assessment module 106 may perform one or more mathematical operations (e.g., add, subtract, multiply, divide, etc.) on the weights, values, and/or scores assigned to application 216, network 204, and/or computing device 202. The result or output of the mathematical operations may represent and/or be used as the risk level of computing environment 220.

Additionally or alternatively, risk-assessment module 106 may determine an environment-specific risk value of computing environment 220 by assessing the specific combination of computing elements included in computing environment 220. For example, risk-assessment module 106 may identify a risk value or score (e.g., a number or percentage) assigned specifically to the specific combination of computing elements included in computing environment 220.

In one example, risk-assessment module 106 may dynamically calculate the environment-specific risk value of computing environment 220 using any type or form of machine learning technique. For example, risk-assessment module 106 may compute the environment-specific risk value of computing environment 220 by applying a regression analysis. Accordingly, the environment-specific risk value of computing environment 220 may adapt, evolve, and/or be refined or updated over time and/or based at least in part on empirical data and/or results from earlier analyses.

As a specific example, risk-assessment module 106 may dynamically calculate the environment-specific risk value based at least in part on the specific type of network through which the user is attempting to access resource 208, the specific type of computing system on which the user is attempting to access resource 208, and the specific type of application by which the user is attempting to access resource 208. For example, risk-assessment module 106 may identify the risk values or scores of application 216, network 204, and/or computing device 202. Risk-assessment module 106 may then apply these values or scores to the equation risk(z)=

$$\frac{W_N \times \text{risk}(N) + W_D \times \text{risk}(D) + W_A \times \text{risk}(A)}{W_N + W_D + W_A},$$

where risk(z) represents the environment-specific risk value or score of computing environment 220, risk(N) represents the individual risk value or score of network 204, $W_N$ represents a weight parameter applied to the risk of network 204, risk(D) represents the individual risk value or score of computing device 202, $W_D$ represents a weight parameter applied to the risk of computing device 202, risk(A) represents the individual risk value or score of application 216, and $W_A$ represents a weight parameter applied to the risk of application 216.

Returning to FIG. 3, at step 310 one or more of the systems described herein may determine an overall risk level for the attempt by the user to access the resource based at least in part on the risk level of the user, the sensitivity level of the resource, and the risk level of the computing environment. For example, risk-assessment module 106 may, as part of server 206 in FIG. 2, determine the overall risk level for the attempt by the user to access resource 208 based at least in part on the risk level of the user, the sensitivity level of resource 208, and the risk level of computing environment 220. Risk-assessment module 106 may initiate this determination in response to the detection of the attempt to access resource 208. The risk level of computing environment 220 may correspond to and/or represent the likelihood and/or degree of threat or danger associated with the user's attempt to access resource 208.

The systems described herein may perform step 310 in a variety of ways. In one example, risk-assessment module 106 may determine the risk level of computing environment 220 based at least in part on the user-specific risk value that corresponds to the role type of the user, the resource-specific sensitivity value that represents the sensitivity level of resource 208, and the environment-specific risk value of computing environment 220. For example, risk-assessment module 106 may apply these values as input to any type or form of algorithm, formula, and/or equation that generates an overall risk score. In this example, the overall risk score may represent the overall risk level for the attempt to access resource 208.

Various algorithms, formulas, and/or equations may be used to determine the overall risk level for the attempt to access resource 208. In one example, risk-assessment module 106 may simply sum up the user-specific risk value, the resource-specific sensitivity value, and the environment-specific risk value. In other words, risk-assessment module 106 may apply these values to the equation g(x,y,z)=x+y+z, where g(x,y,z) represents the overall risk score, x represents the user-specific risk value, y represents the resource-specific sensitivity value, and z represents the environment-specific risk value. In another example, risk-assessment module 106 may apply these values to the equation $$g(x, y, z) = \frac{2\left(\frac{x+y}{2} \times z\right)}{\frac{x+y}{2} + z},$$

where g(x,y,z) represents the overall risk score, x represents the user-specific risk value of the user, y represents the resource-specific sensitivity value of resource 208, and z represents the environment-specific risk value of computing environment 220.

Returning to FIG. 3, at step 312 one or more of the systems described herein may determine whether to grant the user access to the resource via the computing environment based at least in part on the overall risk level for the attempt by the user. For example, access-control module 108 may, as part of server 206 in FIG. 2, determine whether to grant the user access to resource 208 via computing environment 220 based at least in part on the overall risk level for the attempt by the user. In other words, access-control module 108 may determine whether to allow the user to read, write to, modify, and/or download resource 208.

The systems described herein may perform step 312 in a variety of ways. In some examples, access-control module 108 may determine whether to grant the user access to resource 208 based at least in part on an access-control condition involving the overall risk level for the attempt by the user. For example, access-control module 108 may set and/or apply an access-control condition such that (1) in the event that the access-control condition is satisfied (or true), access to resource 208 is granted and (2) in the event that the access-control condition is not satisfied (or false), access to resource 208 is denied. In one example, the access-control condition may be represented as AC(x,y,z)=g(x,y,z)<g(class (a),class(b),class(c))×E, where g(x,y,z) represents the overall risk score for the attempt to access resource 208, x represents the user-specific risk value of the user, y represents the resource-specific sensitivity value of resource 208, z represents the environment-specific risk value of computing environment 220, g(class(a), class(b), class(c)) represents a reference or threshold risk score that is based on the statistical distribution of all risk and/or sensitivity levels, class(a) represents the class of all user-specific risk values, class(b) represents the class of all resource-specific sensitivity values, and class(c) represents the class of all environment-specific risk values, and E represents an enterprise-specific or organization-specific weight parameter used to tune the ratio between false positives and true positives.

In one example, access-control module 108 may dynamically calculate lass(a), class(b), and/or class(c) to represent the high end of the statistical distribution of any risk and/or sensitivity levels. For example, class(a) may be represented as class(a)=average of all role specific risk values+G× standard deviation of all role specific risk values, where G represents an enterprise-specific or organization-specific weight parameter used to tune the ratio between false positives and true positives. Additionally or alternatively, class(b) may be represented as class(b)=average of all resource specific sensitivity values+H×standard deviation of all resource specific sensitivity values, where H represents an enterprise-specific or organization-specific weight parameter used to tune the ratio between false positives and true positives. Similarly, class(c) may be represented as class(c)=average of all environment specific risk values+I× standard deviation of all environment specific risk values, where I represents an enterprise-specific or organization-specific weight parameter used to tune the ratio between false positives and true positives.

In some examples, the method may also include determining whether the overall risk level for the attempt to access resource 208 satisfies a certain threshold. The term "threshold," as used herein, generally refers to any type or form of reference point for determining whether to grant or deny a user's attempt to access a resource. In one example, access-control module 108 may determine that the overall risk level for the attempt to access the resource is below a certain risk threshold. For example, access-control module 108 may dynamically compute the g(class(a),class(b),class (c))×E threshold based on the statistical distribution of all the risk and sensitivity scores. In this example, access-control module 108 may determine that the overall risk level for the attempt to access the resource is below the g(class (a),class(b),class(c))×E threshold. As a result, access-control module 108 may grant the user access to the resource due at least in part to the overall risk level being below this threshold.

As another example, access-control module 108 may determine that the overall risk level for the attempt to access the resource is above a manually set 75% risk threshold. As a result, access-control module 108 may deny the user access to resource 208 due at least in part to the overall risk level being above this manually set threshold.

Figure 4:
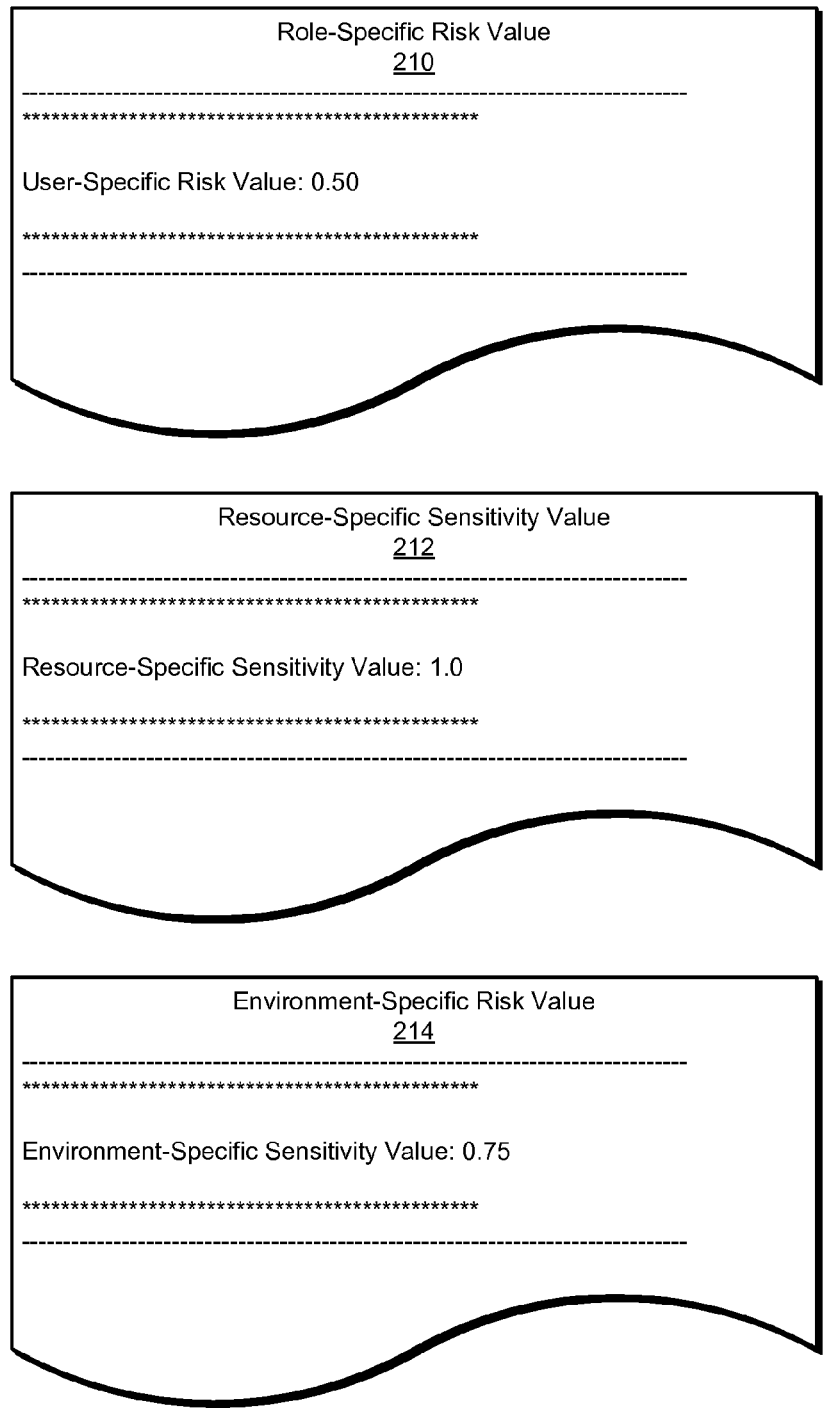
FIG. 4 is an illustration of exemplary information that identifies a user-specific risk value, a resource-specific sensitivity value, and an environment-specific risk value.

As a specific example, access-detection module 104 may detect an attempt by a user to access resource 208 via computing environment 220. In this example, risk-assessment module 106 may identify the risk level of the user attempting to access resource 208 via computing environment 220. Risk-assessment module 106 may then determine that the risk level of the user corresponds to a user-specific risk value 210 in FIGS. 2 and 4. As illustrated in FIG. 4, user-specific risk value 210 may be represented as "0.50."

Additionally or alternatively, risk-assessment module 106 may identify a resource-specific sensitivity value 212 in FIGS. 2 and 4 that represents the sensitivity level of resource 208. As illustrated in FIG. 4, resource-specific sensitivity value 212 may be represented as "1.0." Moreover, risk-assessment module 106 may identify an environment-specific risk value 214 in FIGS. 2 and 4 that represents the risk level of computing environment 220. As illustrated in FIG. 4, environment-specific risk value 214 may be represented as "0.75."

Figure 5:
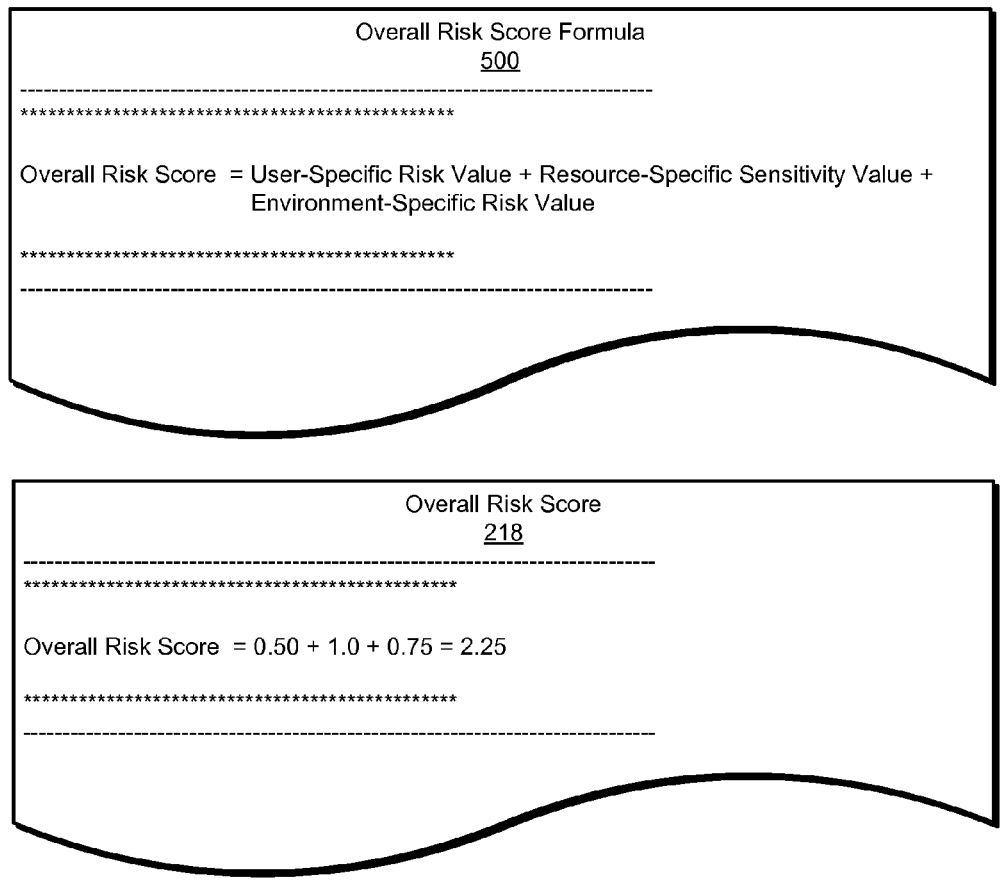
FIG. 5 is an illustration of exemplary information that identifies an overall risk score formula and an overall risk score.

Continuing with the above example, risk-assessment module 106 may calculate an overall risk score 218 in FIGS. 2 and 5 that represents the overall risk level for the user's attempt to access resource 208 via computing environment 220. For example, risk-assessment module 106 may identify overall risk score formula 500 in FIG. 5. As illustrated in FIG. 5, overall risk score formula 500 may be represented as "Overall Risk Score=User-specific Risk Value+Resource-Specific Sensitivity Value+Environment-Specific Risk Value." Accordingly, risk-assessment module 106 may compute overall risk score 218 in FIG. 5 in accordance with overall risk score formula 500. As illustrated in FIG. 5, overall risk score 218 may be calculated as "Overall Risk Score=0.50+1.0+0.75=2.25."

In one example, access-control module 108 may determine that the "2.25" overall risk score is above a certain risk threshold. As a result, access-control module 108 may deny the user access to resource 208 due at least in part to the "2.25" overall risk score being above this threshold. In another example, access-control module 108 may determine that the "2.25" overall risk score is below a certain risk threshold. As a result, access-control module 108 may grant the user access to resource 208 due at least in part to the "2.25" overall risk score being below this threshold.

As explained above in connection with FIGS. 1-5, an access-control system may make certain access-control decisions based at least in part on (1) the actor (whether a human user or a computing process) attempting to access a resource, (2) the context that identifies a combination of computing elements including (A) networks (such as VPNs, corporate networks, and/or home networks), (B) computing devices (such as phones, computers, servers, and/or point-of-sale devices), and (C) applications used in the actor's attempt to access the resource, and (3) the resource (such as an object, a file, and/or a database) that the user is attempting to access. As an example, the access-control system may either generate risk scores for the actor and/or the context and a sensitivity score for the resource or identify existing risk and sensitivity scores generated by an external risk profiler. These scores may depend on various factors (such as Data Loss Prevention (DLP) considerations, machine learning techniques, file types, attributes, owner groups, content, metadata, data flow, colocation based on structural similarity, etc.). Accordingly, these scores may be updated regularly and/or dynamically calculated.

In one example, the access-control system may calculate an overall risk score g(x,y,z) for the user's attempt to access the resource by performing certain mathematical operations on the risk and sensitivity scores. In this example, the access-control system may set and/or maintain an access-control condition that dictates whether the user's attempt to access the resource is granted. For example, the access-control system may use AC(x,y,z)=g(x,y,z)<g(class(a),class (b),class(c))×E as the access-control condition. By setting and/or maintaining such an access-control condition, the access-control system may be able to identify bad combinations of high risk and high sensitivity. In other words, the access-control system may be able to prevent a high-risk actor from accessing a high-sensitivity resource in a high-risk context.

Figure 6:
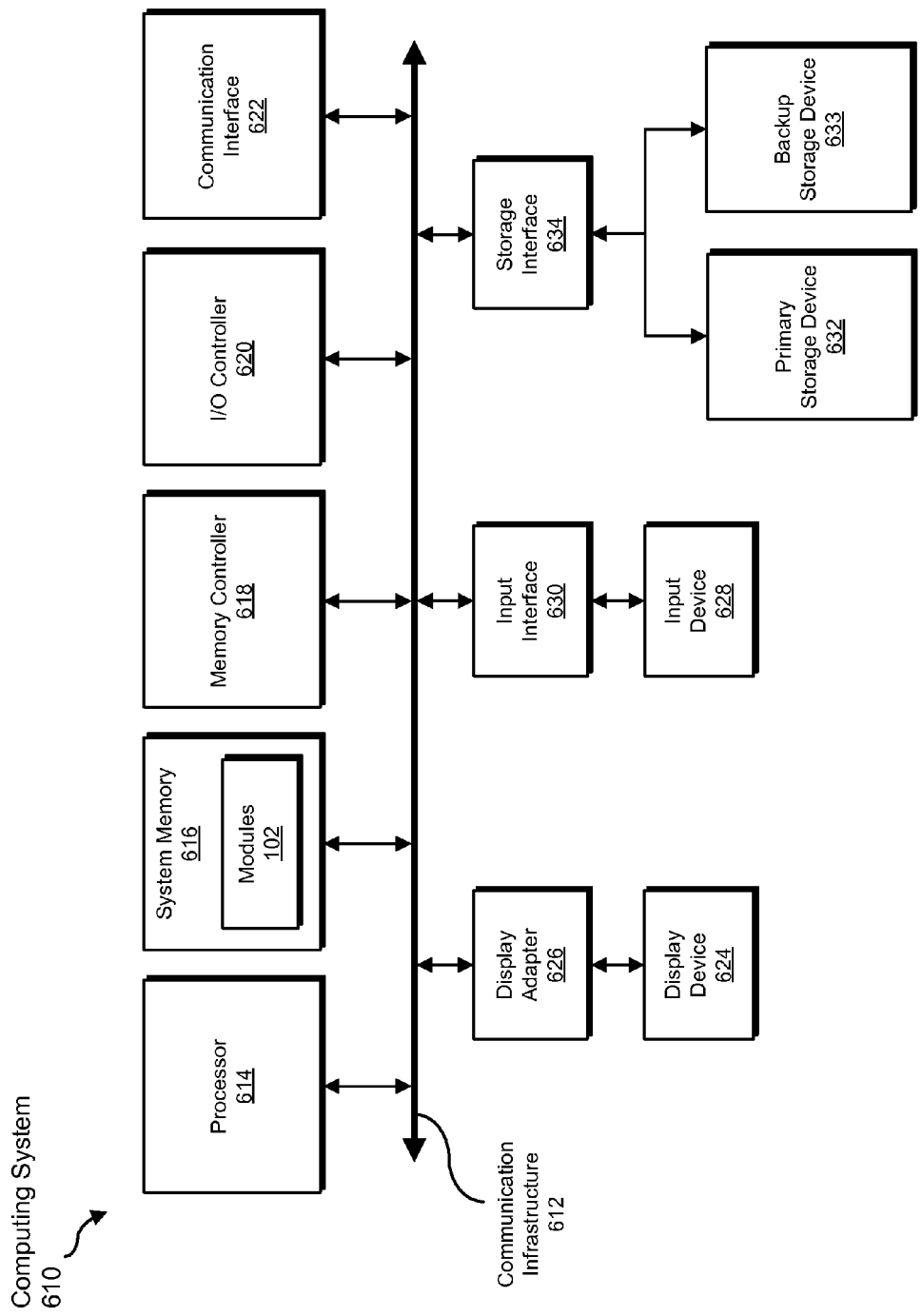
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
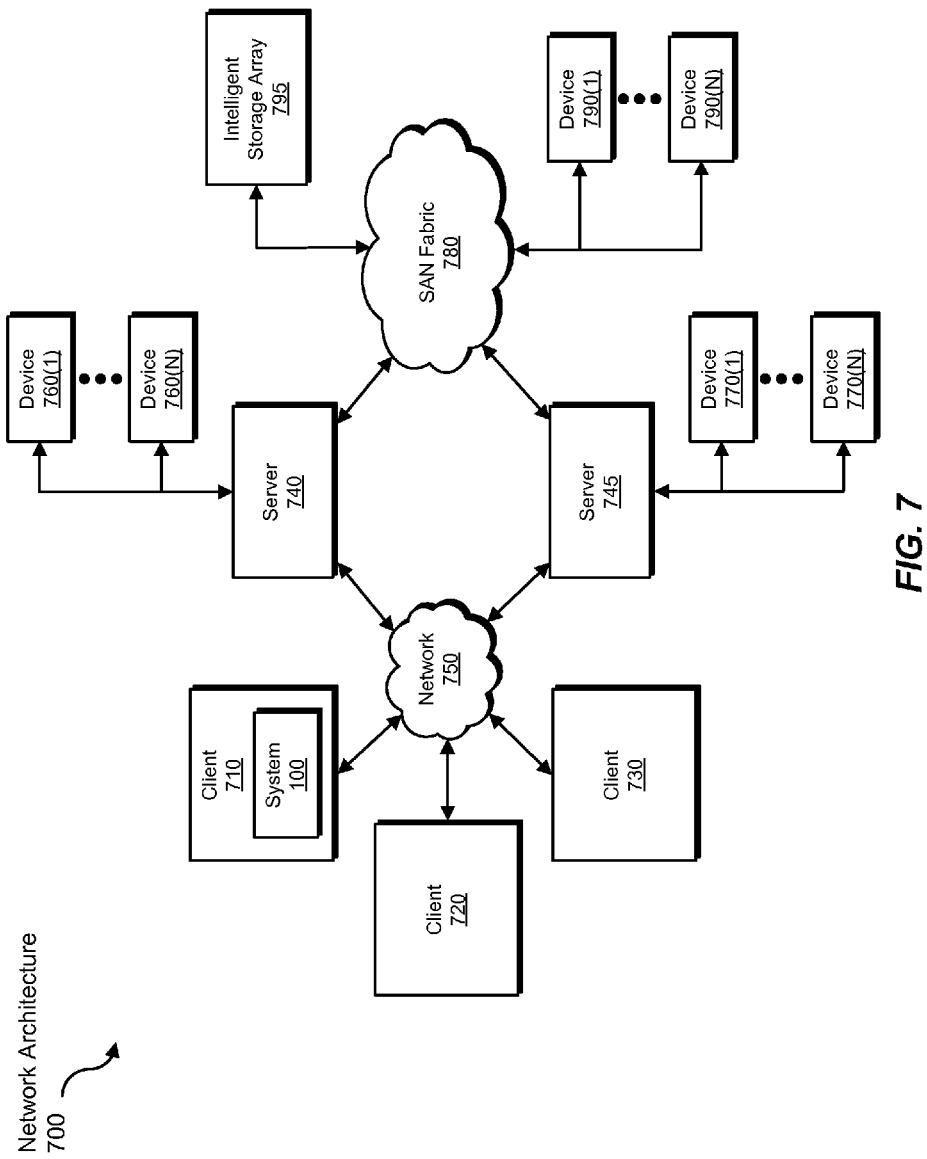
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for dynamic access control over shared resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed into risk and/or sensitivity scores, transform the data into risk and/or sensitivity scores, output a result of the transformation to determine whether to grant access to a resource, use the result of the transformation to improve dynamic access control over shared resources, and store the result of the transformation for future reference and/or use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamic access control over shared resources, at least a portion of the method being performed by a computing device comprising at least one processor, the method comprising:
   detecting an attempt by a user to access a resource via a computing environment;
   identifying a risk value that:
      represents a risk level of the user attempting to access the resource via the computing environment; and
      is based at least in part on a role type of the user;
   identifying a sensitivity value that represents a sensitivity level of the resource that the user is attempting to access via the computing environment;
   identifying a risk value that represents a risk level of the computing environment through which the user is attempting to access the resource;
   performing a case-by-case evaluation of the attempt to access the resource by calculating an overall risk score for the attempt to access the resource by summing up:
      the risk value that represents the risk level of the user;
      the sensitivity value that represents the sensitivity level of the resource; and
      the risk value that represents the risk level of the computing environment;
   dynamically computing a threshold based at least in part on a statistical distribution of a first class of all risk levels of users, a second class of all sensitivity levels of resources, and a third class of all risk levels of computing environments, wherein:
      the first class represents a first sum calculated by adding an average of all role specific risk values to a weighted standard deviation of all the role specific risk values;
      the second class represents a second sum calculated by adding an average of all resource specific sensitivity values to a weighted standard deviation of all the resource specific sensitivity values; and
      the third class represents a third sum calculated by adding an average of all environment specific risk values to a weighted standard deviation of all the environment specific risk values;
   determining whether the overall risk score for the attempt to access the resource satisfies the dynamically computed threshold; and
   determining, based at least in part on whether the overall risk score for the attempt to access the resource satisfies the dynamically computed threshold, whether to grant the user access to the resource via the computing environment.

2. The method of claim 1, wherein the user comprises at least one of:
   a person operating a computing system; and
   a computing process running on a computing system.

3. The method of claim 1, wherein the computing environment comprises at least one of:
   a specific type of network through which the user is attempting to access the resource;
   a specific type of computing system on which the user is attempting to access the resource; and
   a specific type of application by which the user is attempting to access the resource.

4. The method of claim 1, wherein the resource comprises at least one of:
   a file; and
   a database.

5. The method of claim 1, wherein:
   identifying the risk value that represents the risk level of the user attempting to access the resource comprises identifying a user-specific risk value that is further based at least in part on a behavior of the user.

6. The method of claim 5, wherein:
   identifying the user-specific risk value comprises dynamically calculating the user-specific risk value using at least one machine learning technique;
   identifying the sensitivity value that represents the sensitivity level of the resource comprises dynamically calculating the sensitivity value using at least one machine learning technique; and
   identifying the risk value that represents the risk level of the computing environment comprises dynamically calculating the risk value that represents the risk level of the computing environment using at least one machine learning technique.

7. The method of claim 1, wherein identifying the risk value that represents the risk level of the computing environment comprises calculating an environment-specific risk value that represents the risk level of the computing environment based at least in part on:
   a specific type of network through which the user is attempting to access the resource;
   a specific type of computing system on which the user is attempting to access the resource; and
   a specific type of application by which the user is attempting to access the resource.

8. The method of claim 1, wherein determining whether to grant the user access to the resource comprises:
   determining that the overall risk score for the attempt to access the resource is below the dynamically computed threshold; and
   granting the user access to the resource due at least in part to the overall risk score being below the dynamically computed threshold.

9. The method of claim 1, wherein determining whether to grant the user access to the resource comprises:
  determining that the overall risk score for the attempt to access the resource is above the dynamically computed threshold; and
  denying the user access to the resource due at least in part to the overall risk score being above the dynamically computed threshold.

10. A system for dynamic access control over shared resources, the system comprising:
  an access-detection module, stored in memory, that detects an attempt by a user to access a resource via a computing environment;
  a risk-assessment module, stored in memory, that:
    identifies a risk value that:
      represents a risk level of the user attempting to access the resource via the computing environment; and
      is based at least in part on a role type of the user;
    identifies a sensitivity value that represents a sensitivity level of the resource that the user is attempting to access via the computing environment;
    identifies a risk value that represents a risk level of the computing environment through which the user is attempting to access the resource; and
    performs a case-by-case evaluation of the attempt to access the resource by calculating an overall risk score for the attempt by the user to access the resource by summing up:
      the risk value that represents the risk level of the user;
      the sensitivity value that represents the sensitivity level of the resource; and
      the risk value that represents the risk level of the computing environment;
    dynamically computes a threshold based at least in part on a statistical distribution of a first class of all risk levels of users, a second class of all sensitivity levels of resources, and a third class of all risk levels of computing environments, wherein:
      the first class represents a first sum calculated by adding an average of all role specific risk values to a weighted standard deviation of all the role specific risk values;
      the second class represents a second sum calculated by adding an average of all resource specific sensitivity values to a weighted standard deviation of all the resource specific sensitivity values; and
      the third class represents a third sum calculated by adding an average of all environment specific risk values to a weighted standard deviation of all the environment specific risk values;
  an access-control module, stored in memory, that:
    determines whether the overall risk score for the attempt to access the resource satisfies the dynamically computed threshold; and
    determines, based at least in part on whether the overall risk score for the attempt to access the resource satisfies the dynamically computed threshold, whether to grant the user access to the resource via the computing environment; and
  at least one physical processor configured to execute the access-detection module, the risk-assessment module, and the access-control module.

11. The system of claim 10, wherein the user comprises at least one of:
  a person operating a computing system; and
  a computing process running on a computing system.

12. The system of claim 10, wherein the computing environment comprises at least one of:
  a specific type of network through which the user is attempting to access the resource;
  a specific type of computing system on which the user is attempting to access the resource; and
  a specific type of application by which the user is attempting to access the resource.

13. The system of claim 10, wherein the resource comprises at least one of:
  a file; and
  a database.

14. The system of claim 10, wherein the risk-assessment module:
  identifies the risk level of the user attempting to access the resource by identifying a user-specific risk value that is further based at least in part on a behavior of the user.

15. The system of claim 14, wherein the risk-assessment module:
  identifies the user-specific risk value by dynamically calculating the user-specific risk value using at least one machine learning technique;
  identifies the sensitivity value that represents the sensitivity level of the resource by dynamically calculating the sensitivity value using at least one machine learning technique; and
  identifies the risk value that represents the risk level of the computing environment by dynamically calculating the risk value that represents the risk level of the computing environment using at least one machine learning technique.

16. The system of claim 10, wherein the risk-assessment module identifies the risk value that represents the risk level of the computing environment by calculating an environment-specific risk value that represents the risk level of the computing environment based at least in part on:
  a specific type of network through which the user is attempting to access the resource;
  a specific type of computing system on which the user is attempting to access the resource; and
  a specific type of application by which the user is attempting to access the resource.

17. A non-transitory computer-readable medium comprising one or more computer-executable instructions that, when executed by at least one processor of a computing device, cause the computing device to:
  detect an attempt by a user to access a resource via a computing environment;
  identify a risk value that:
    represents a risk level of the user attempting to access the resource via the computing environment; and
    is based at least in part on a role type of the user;
  identify a sensitivity value that represents a sensitivity level of the resource that the user is attempting to access via the computing environment;
  identify a risk value that represents a risk level of the computing environment through which the user is attempting to access the resource;
  perform a case-by-case evaluation of the attempt to access the resource by calculating an overall risk score for the attempt to access the resource by summing up:
    the risk value that represents the risk level of the user;
    the sensitivity value that represents the sensitivity level of the resource; and the risk value that represents the risk level of the computing environment;

dynamically compute a threshold based at least in part on a statistical distribution of a first class of all risk levels of users, a second class of all sensitivity levels of resources, and a third class of all risk levels of computing environments, wherein:
- the first class represents a first sum calculated by adding an average of all role specific risk values to a weighted standard deviation of all the role specific risk values;
- the second class represents a second sum calculated by adding an average of all resource specific sensitivity values to a weighted standard deviation of all the resource specific sensitivity values; and
- the third class represents a third sum calculated by adding an average of all environment specific risk values to a weighted standard deviation of all the environment specific risk values;

determine whether the overall risk score for the attempt to access the resource satisfies the dynamically computed threshold; and determine, based at least in part on whether the overall risk score for the attempt to access the resource satisfies the dynamically computed threshold, whether to grant the user access to the resource via the computing environment.

\* \* \* \* \*